United States Patent
Irie et al.

(10) Patent No.: US 11,529,994 B2
(45) Date of Patent: Dec. 20, 2022

(54) VEHICLE CONTROL SYSTEM

(71) Applicant: TOYOTA JIDOSHA KABUSHIKI KAISHA, Toyota (JP)

(72) Inventors: Ryo Irie, Okazaki (JP); Masaki Shiota, Sunto-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 581 days.

(21) Appl. No.: 16/285,935

(22) Filed: Feb. 26, 2019

(65) Prior Publication Data
US 2019/0315403 A1    Oct. 17, 2019

(30) Foreign Application Priority Data

Apr. 11, 2018    (JP) .............................. JP2018-076390

(51) Int. Cl.
*B62D 15/02*    (2006.01)
*B60W 10/20*    (2006.01)
*B62D 5/00*    (2006.01)

(52) U.S. Cl.
CPC ......... *B62D 15/025* (2013.01); *B62D 15/029* (2013.01); *B60W 10/20* (2013.01); *B62D 5/005* (2013.01); *B62D 15/021* (2013.01)

(58) Field of Classification Search
CPC .... B62D 15/025; B62D 15/029; B62D 5/005; B62D 15/021; B62D 1/286; B60W 10/20; G05D 1/0066
See application file for complete search history.

(56) References Cited

U.S. PATENT DOCUMENTS

| | | | |
|---|---|---|---|
| 6,085,860 A | 7/2000 | Hackl et al. | |
| 8,965,633 B2 * | 2/2015 | Lee | B62D 6/02 701/41 |
| 2005/0270145 A1 * | 12/2005 | Kataoka | B62D 15/025 340/435 |
| 2007/0288143 A1 | 12/2007 | Arima et al. | |

(Continued)

FOREIGN PATENT DOCUMENTS

| | | |
|---|---|---|
| CN | 102765420 A | 11/2012 |
| CN | 107054362 A | 8/2017 |

(Continued)

OTHER PUBLICATIONS

English Translation: Yanaka, JP 2004-175230-A, Jun. 2004, Japanese Patent Publication (Year: 2004).*

*Primary Examiner* — Nadeem Odeh
(74) *Attorney, Agent, or Firm* — Sughrue Mion, PLLC

(57) ABSTRACT

A vehicle control system installed on a vehicle includes: an automatic steering control device configured to execute automatic steering control that determines a steering angle command value and controls steering of the vehicle such that an actual steering angle follows the steering angle command value; a stop state detection device configured to detect a stop state where the vehicle is stopped; and an override detection device configured to detect an override operation by a driver of the vehicle. When the override operation is detected in the stop state, the automatic steering control device prohibits variation in the actual steering angle due to the automatic steering control, until the vehicle starts moving.

5 Claims, 9 Drawing Sheets

(56) References Cited

U.S. PATENT DOCUMENTS

| | | | |
|---|---|---|---|
| 2008/0097666 A1* | 4/2008 | Oba | B66F 11/04 |
| | | | 701/41 |
| 2010/0332081 A1 | 12/2010 | Buering et al. | |
| 2012/0123643 A1* | 5/2012 | Limpibuntering | B62D 1/286 |
| | | | 701/42 |
| 2012/0283912 A1* | 11/2012 | Lee | B62D 15/025 |
| | | | 701/41 |
| 2017/0120908 A1* | 5/2017 | On | B60W 50/0097 |
| 2018/0093709 A1* | 4/2018 | Oguro | B60W 30/18054 |
| 2018/0170431 A1* | 6/2018 | Shirozono | B62D 15/025 |
| 2021/0016830 A1* | 1/2021 | Riese | B62D 15/021 |

FOREIGN PATENT DOCUMENTS

| | | |
|---|---|---|
| DE | 197 51 227 A1 | 9/1998 |
| DE | 10 2007 000 976 A1 | 5/2009 |
| JP | 2004175230 A * | 6/2004 |
| JP | 2007-331481 A | 12/2007 |
| JP | 2011-031769 A | 2/2011 |
| JP | 4624307 B2 | 2/2011 |
| JP | 2017-177943 A | 10/2017 |
| JP | 2017-177944 A | 10/2017 |

\* cited by examiner

VEHICLE CONTROL SYSTEM

BACKGROUND

Technical Field

The present disclosure relates to a vehicle control system installed on a vehicle. In particular, the present disclosure relates to a vehicle control system that executes automatic steering control.

Background Art

Patent Literature 1 discloses an automatic steering device. The automatic steering device executes feedback control that controls a motor of an electric power steering device according to a command steering angle to make an actual steering angle follow the command steering angle. When an override operation is performed by a driver, the automatic steering device temporarily suspends the feedback control. When the override operation by the driver ends, the automatic steering device resumes the feedback control. In a predetermined period after resuming the feedback control, the automatic steering device limits an angular velocity and an angular acceleration of the actual steering angle.

Patent Literature 2 discloses a travel support device of a vehicle. The travel support device executes following control that makes the vehicle follow a target travel path. Moreover, the travel support device determines, based on a steering angle, whether or not there is an override operation by a driver. When determining that there is the override operation, the travel support device stops the following control.

Patent Literature 3 discloses a travel control device of a vehicle. The travel control device detects a steering angle of a steered wheel and controls a steering actuator such that the detected steering angle becomes a target steering angle. When a difference between the target steering angle and the detected steering angle is equal to or larger than a predetermined value, the travel control device limits a vehicle travel speed to a predetermined speed or less.

LIST OF RELATED ART

Patent Literature 1: Japanese Unexamined Patent Application Publication No. JP-2017-177944
Patent Literature 2: Japanese Unexamined Patent Application Publication No. JP-2011-031769
Patent Literature 3: Japanese Patent No. 4624307

SUMMARY

According to the technique disclosed in the above-mentioned Patent Literature 1, automatic steering control (feedback control) is executed such that an actual steering angle follows a steering angle command value (command steering angle). When a driver performs an override operation, the automatic steering control is temporarily suspended. When the override operation by the driver ends, the automatic steering control is resumed.

Here, let us consider a situation where a vehicle is stopped. When the driver performs the override operation during a period when the vehicle is stopped, the automatic steering control is temporarily suspended. Due to the override operation, the actual steering angle changes to a value different from the steering angle command value. After that, when the override operation ends, the automatic steering control is resumed. At this time, the actual steering angle is different from the steering angle command value, and thus the actual steering angle returns to the steering angle command value due to the automatic steering control. That is to say, a steering wheel rotates automatically (spontaneously).

As described above, when the driver performs the override operation and then releases the driver's hand from a steering wheel during the period when the vehicle is stopped, the steering wheel rotates automatically. Such the automatic rotation of the steering wheel causes the driver to feel senses of strangeness and discomfort.

An object of the present disclosure is to provide a technique that is related to a vehicle having an automatic steering control function and that can suppress automatic rotation of a steering wheel during a period when the vehicle is stopped.

A first disclosure is directed to a vehicle control system installed on a vehicle.

The vehicle control system includes:
an automatic steering control device configured to execute automatic steering control that determines a steering angle command value and controls steering of the vehicle such that an actual steering angle follows the steering angle command value;
a stop state detection device configured to detect a stop state where the vehicle is stopped; and
an override detection device configured to detect an override operation by a driver of the vehicle.

When the override operation is detected in the stop state, the automatic steering control device prohibits variation in the actual steering angle due to the automatic steering control, until the vehicle starts moving.

A second disclosure further has the following feature in addition to the first disclosure.

During a period from when the override operation is detected in the stop state to when the vehicle starts moving, the automatic steering control device sets the steering angle command value to the actual steering angle with keeping the automatic steering control activated.

A third disclosure further has the following feature in addition to the first disclosure.

During a period from when the override operation is detected in the stop state to when the vehicle starts moving, the automatic steering control device temporarily deactivates the automatic steering control.

A fourth disclosure further has the following feature in addition to any one of the first to third disclosures.

The vehicle control system further includes an automatic travel control device configured to control travel of the vehicle.

When making the vehicle start automatically, the automatic travel control device determines whether or not an absolute value of a difference between the steering angle command value and the actual steering angle is larger than a first threshold.

When the absolute value is larger than the first threshold, the automatic travel control device executes speed suppression control that suppresses a speed of the vehicle as compared with a case where the absolute value is equal to or smaller than the first threshold.

A fifth disclosure further has the following feature in addition to the fourth disclosure.

The automatic travel control device continues the speed suppression control until the absolute value becomes equal to or smaller than a second threshold being smaller than the first threshold.

According to the present disclosure, when the override operation is detected in the stop state, the automatic steering control device prohibits variation in the actual steering angle due to the automatic steering control, until the vehicle starts moving. Even when the override operation ends in the stop state, the variation in the actual steering angle due to the automatic steering control is prohibited until the vehicle starts moving. Therefore, the automatic rotation of the steering wheel during the period when the vehicle is stopped is suppressed. During the period when the vehicle is stopped, the actual steering angle is maintained while reflecting the override operation by the driver. As a result, the driver's senses of strangeness and discomfort are suppressed.

EMBODIMENTS

Embodiments of the present disclosure will be described below with reference to the attached drawings.

1. Outline

Figure 1:
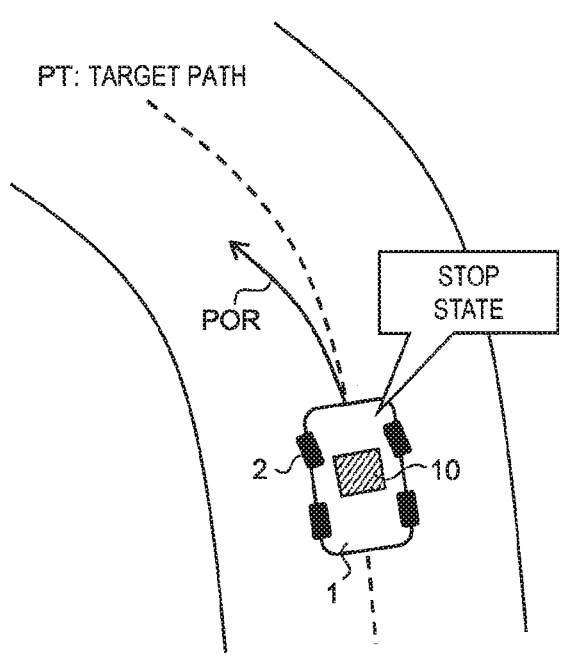
FIG. 1 is a conceptual diagram for explaining an outline of a vehicle control system according to an embodiment of the present disclosure.

FIG. 1 is a conceptual diagram for explaining an outline of a vehicle control system 10 according to the present embodiment. The vehicle control system 10 is installed on a vehicle 1 and controls an operation of the vehicle 1. More specifically, the vehicle control system 10 executes at least "automatic steering control" that automatically controls steering of the vehicle 1.

The steering of the vehicle 1 means turning of a wheel 2 of the vehicle 1. A target value of a steering angle of the wheel 2 is hereinafter referred to as a "steering angle command value $\theta^*$". On the other hand, an actual steering angle of the wheel 2 is hereinafter referred to as an "actual steering angle $\theta a$". In the automatic steering control, the vehicle control system 10 determines the steering angle command value $\theta^*$ and performs the steering of the vehicle 1 (that is, the turning of the wheel 2) such that the actual steering angle $\theta a$ follows the steering angle command value $\theta^*$.

For example, the vehicle control system 10 determines a target path PT (target trajectory) as shown in FIG. 1. A steering angle of the wheel 2 necessary for the vehicle 1 to travel with following the target path PT is hereinafter referred to as a "target path steering angle $\theta pt$". While the vehicle 1 travels, the vehicle control system 10 calculates the target path steering angle $\theta pt$ and sets the steering angle command value $\theta^*$ to the target path steering angle $\theta pt$. Then, the vehicle control system 10 executes the automatic steering control such that the actual steering angle $\theta a$ follows the steering angle command value $\theta^*$ (=the target path steering angle $\theta pt$). In other words, the vehicle control system 10 executes the automatic steering control such that the vehicle 1 follows the target path PT.

Next, let us consider a "stop state" where the vehicle 1 is stopped. Especially, let us consider a situation where a driver of the vehicle 1 performs an "override operation" in the stop state. The override operation in the present embodiment is a steering wheel operation actively performed by the driver.

When the override operation is performed in the stop state, the actual steering angle $\theta a$ changes to a value different from the target path steering angle $\theta pt$. For example, a path POR shown in FIG. 1 represents a path (trajectory) of the vehicle 1 that is expected from the actual steering angle $\theta a$ after the override operation is performed. The path POR deviates from the target path PT. According to a conventional technique, if the driver releases the driver's hand from a steering wheel when the actual steering angle $\theta a$ is different from the target path steering angle $\theta pt$, the actual steering angle $\theta a$ returns to the target path steering angle $\theta pt$ due to the automatic steering control. That is to say, the steering wheel rotates automatically (spontaneously). Such the automatic rotation of the steering wheel causes the driver to feel senses of strangeness and discomfort.

In view of the above, when the override operation is performed in the stop state, the vehicle control system 10 according to the present embodiment prohibits variation in the actual steering angle $\theta a$ due to the automatic steering control, until the vehicle 1 starts moving. Even when the override operation ends in the stop state, the variation in the actual steering angle $\theta a$ due to the automatic steering control is prohibited until the vehicle 1 starts moving. Therefore, the automatic rotation of the steering wheel during the period when the vehicle 1 is stopped is suppressed. During the period when the vehicle 1 is stopped, the actual steering angle $\theta a$ is maintained while reflecting the override operation by the driver. As a result, the driver's senses of strangeness and discomfort are suppressed.

Figure 2:
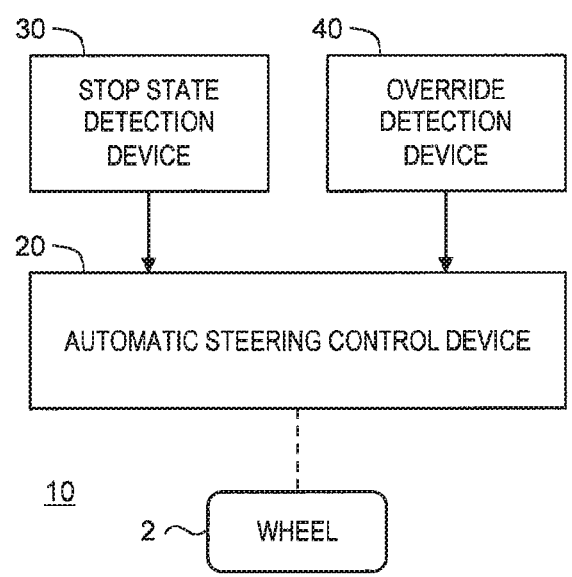
FIG. 2 is a block diagram schematically showing a configuration of the vehicle control system according to the embodiment of the present disclosure.

FIG. 2 is a block diagram schematically showing a configuration of the vehicle control system 10 according to the present embodiment. The vehicle control system 10 includes an automatic steering control device 20, a stop state detection device 30, and an override detection device 40.

The automatic steering control device 20 executes the automatic steering control. That is, the automatic steering control device 20 determines the steering angle command value $\theta^*$ and controls the steering of the vehicle 1 such that the actual steering angle $\theta a$ follows the steering angle command value $\theta^*$. The stop state detection device 30 detects the stop state where the vehicle 1 is stopped. The override detection device 40 detects the override operation by the driver of the vehicle 1. When the override operation is detected in the stop state, the automatic steering control device 20 prohibits variation in the actual steering angle θa due to the automatic steering control, until the vehicle 1 starts moving. Thus, the above-described effects are achieved.

Hereinafter, the vehicle control system 10 according to the present embodiment will be described in more detail.

2. Vehicle Control System

2-1. Configuration Example

Figure 3:
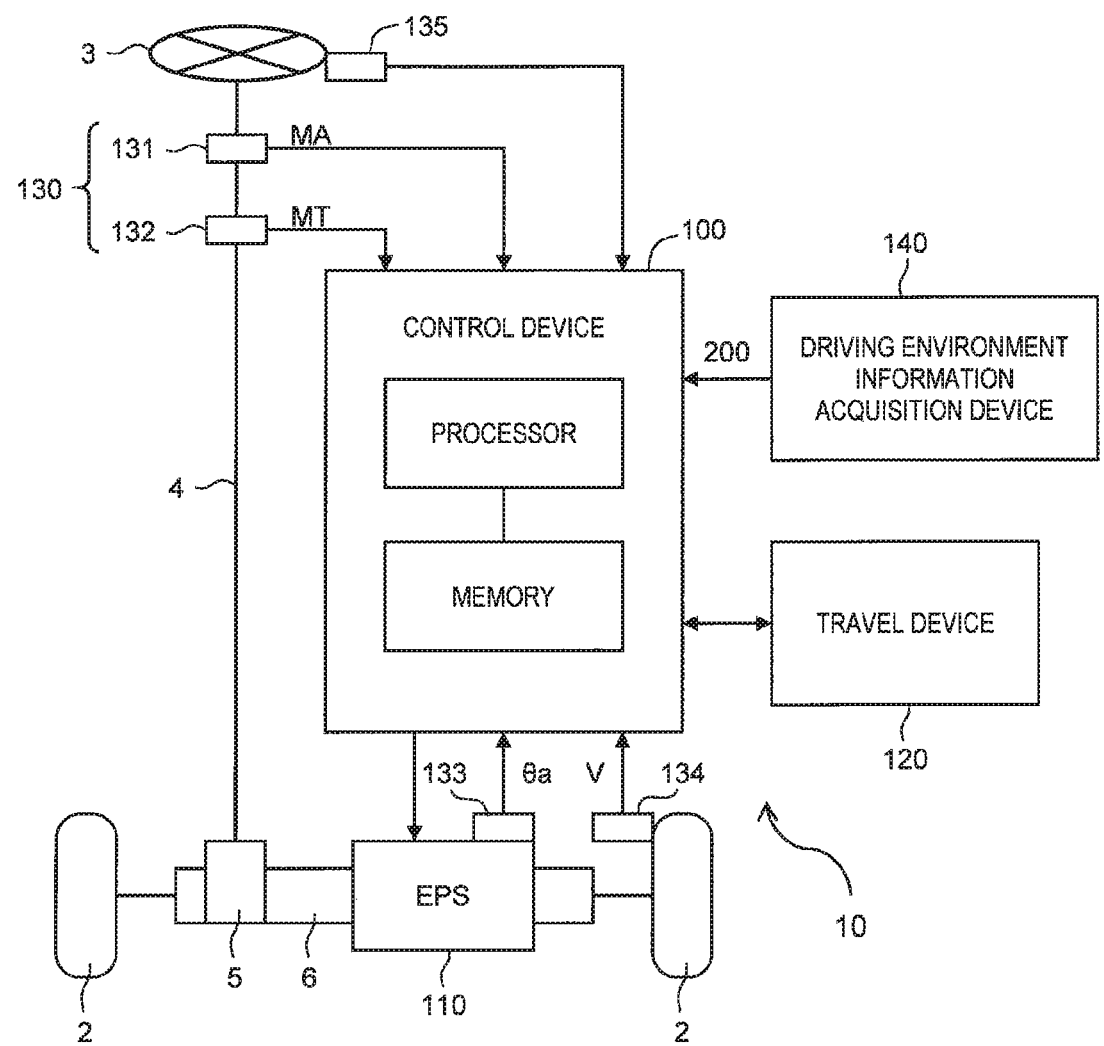
FIG. 3 is a block diagram showing a concrete configuration example of a vehicle and the vehicle control system according to the embodiment of the present disclosure.

FIG. 3 is a block diagram showing a concrete configuration example of the vehicle 1 and the vehicle control system 10 according to the present embodiment.

The vehicle 1 is provided with the wheel 2, the steering wheel 3, a steering shaft 4, a pinion gear 5, and a rack bar 6. The steering wheel 3 is an operation member used by the driver for performing a steering operation. One end of the steering shaft 4 is coupled to the steering wheel 3, and the other end thereof is coupled to the pinion gear 5. The pinion gear 5 engages with the rack bar 6. Both ends of the rack bar 6 are respectively coupled to left and right wheels 2 through tie rods. A rotation of the steering wheel 3 is transmitted to the pinion gear 5 through the steering shaft 4. A rotational motion of the pinion gear 5 is converted into a linear motion of the rack bar 6, and thereby the steering angle (i.e. the actual steering angle θa) of the wheel 2 changes.

The vehicle control system 10 includes a control device (controller) 100, an EPS (Electric Power Steering) device 110, a travel device 120, a sensor group 130, and a driving environment information acquisition device 140.

The control device (controller) 100 is a microcomputer provided with a processor and a memory. The control device 100 is also called an ECU (Electronic Control Unit). A variety of processing by the control device 100 is achieved by the processor executing a control program stored in the memory.

The EPS device 110 is a turning device that turns the wheel 2. More specifically, the EPS device 110 includes an electric motor and generates a torque by a rotation of the electric motor. For example, the electric motor is coupled to the rack bar 6 through a conversion mechanism. When a rotor of the electric motor rotates, the conversion mechanism converts the rotational motion into a linear motion of the rack bar 6, and thereby the steering angle (i.e. the actual steering angle θa) of the wheel 2 changes. An operation of the EPS device 110 is controlled by the control device 100.

The travel device 120 includes a driving device and a braking device. The driving device is a power source that generates a driving force. The driving device is exemplified by an engine and an electric motor. The braking device generates a braking force. An operation of the travel device 120 is controlled by the control device 100.

The sensor group 130 includes a steering wheel angle sensor 131, a steering torque sensor 132, a steering angle sensor 133, a vehicle speed sensor 134, and a steering wheel touch sensor 135.

The steering wheel angle sensor 131 detects a steering wheel angle MA being a steering angle of the steering wheel 3. The steering wheel angle sensor 131 outputs information indicating the steering wheel angle MA to the control device 100.

The steering torque sensor 132 detects a steering torque MT applied to the steering shaft 4. The steering torque sensor 132 outputs information indicating the steering torque MT to the control device 100.

The steering angle sensor 133 detects the actual steering angle θa corresponding to a steering angle of the wheel 2. For example, the steering angle sensor 133 calculates the actual steering angle θa from a rotation angle of the electric motor of the EPS device 110. The steering angle sensor 133 outputs information indicating the actual steering angle θa to the control device 100.

The vehicle speed sensor 134 detects a vehicle speed V being a speed of the vehicle 1. The vehicle speed V may be calculated from a rotating speed of each wheel 2 detected by a wheel speed sensor. The vehicle speed sensor 134 outputs information indicating the vehicle speed V to the control device 100.

The steering wheel touch sensor 135 detects a holding state indicating whether the driver of the vehicle 1 holds the steering wheel 3. The steering wheel touch sensor 135 outputs information indicating the holding state to the control device 100.

The driving environment information acquisition device 140 acquires information necessary for automated driving control. The information necessary for the automated driving control is information indicating driving environment for the vehicle 1, and the information is hereinafter referred to as "driving environment information 200". The driving environment information 200 includes position information, map information, surrounding situation information, vehicle state information, and so forth. The position information is information indicating a position of the vehicle 1, and is acquired by the use of a GPS (Global Positioning System) for example. The map information indicates a lane configuration and a road shape. The surrounding situation information is information indicating a situation around the vehicle 1, and is acquired by the use of an external sensor such as a camera, a LIDAR, a radar, and the like. For example, the surrounding situation information includes information of a surrounding vehicle and a white line around the vehicle 1. The vehicle state information includes the vehicle speed V, a lateral acceleration, a yaw rate, and so forth. The driving environment information acquisition device 140 transmits the acquired driving environment information 200 to the control device 100.

2-2. Automatic Steering Control Device 20 & Automated Driving Control Device The control device 100 executes at least the above-described "automatic steering control". In the automatic steering control, the EPS device 110 is utilized. More specifically, the control device 100 determines the steering angle command value θ* being a target value of the steering angle of the wheel 2. In addition, the control device 100 acquires the information of the actual steering angle θa from the steering angle sensor 133. The control device 100 controls the operation of the EPS device 110 such that the actual steering angle θa follows the steering angle command value θ*.

For example, the control device 100 executes the automatic steering control such that the vehicle 1 travels with following the target path PT (see FIG. 1). To that end, the control device 100 calculates the target path PT and the target path steering angle θpt based on the driving environment information 200. Various examples have been proposed as a method of calculating the target path PT and the target path steering angle θpt. In the present embodiment, the method of calculating thereof is not limited in particular. While the vehicle 1 travels, the control device 100 sets the steering angle command value θ* to the target path steering angle θpt. Then, the control device 100 controls the operation of the EPS device 110 such that the actual steering angle θa follows the steering angle command value θ* (=the target path steering angle θpt). As a result, the vehicle 1 travels so as to follow the target path PT.

It can be said that the control device 100, the EPS device 110, the sensor group 130 (especially, the steering angle sensor 133), and the driving environment information acquisition device 140 constitute the "automatic steering control device 20" shown in FIG. 2.

Furthermore, the control device 100 may execute "automatic travel control" that controls travel of the vehicle 1, in addition to the automatic steering control. The automatic travel control includes acceleration control and deceleration control. The control device 100 executes the automatic travel control by controlling the operation of the travel device 120 (the driving device and the braking device). For example, the control device 100 executes the automatic travel control such that the vehicle 1 travels with following the target path PT. It can be said that the control device 100, the travel device 120, the sensor group 130, and the driving environment information acquisition device 140 constitute an "automatic travel control device" that executes the automatic travel control.

It can be said that the automatic steering control device 20 and the automatic travel control device constitute an "automated driving control device" that controls automated driving of the vehicle 1.

2-3. Stop State Detection Device 30

The control device 100 executes stop state detection processing that detects the stop state of the vehicle 1. More specifically, the control device 100 receives the information of the vehicle speed V from the vehicle speed sensor 134. When the vehicle speed V is zero, the control device 100 determines that the vehicle 1 is stopped. When the vehicle speed V increases from zero, the control device 100 determines that the stop state ends and the vehicle 1 starts moving.

As another example, the control device 100 may regard occurrence of acceleration request (driving request) to the travel device 120 as the end of the stop state and the start of the vehicle 1. When the automatic travel control is ON (activated), the control device 100 (i.e. the automatic travel control device) automatically generates the acceleration request. On the other hand, when the automatic travel control is OFF (deactivated), the control device 100 generates the acceleration request according to an acceleration operation by the driver.

It can be said that the control device 100, the travel device 120, and the sensor group 130 (especially, the vehicle speed sensor 134) constitute the "stop state detection device 30" shown in FIG. 2.

2-4. Override Detection Device 40

The control device 100 executes override detection processing that detects the override operation by the driver. The override operation is an operation of the steering wheel 3 actively performed by the driver. For example, when all of the following first to third conditions are satisfied, the control device 100 determines that the override operation is performed. On the other hand, when at least one of the following first to third conditions is not satisfied, the control device 100 determines that the override operation is not performed.

First condition: the driver holds the steering wheel 3.
Second condition: the steering torque MT is equal to or greater than a predetermined threshold MTth.
Third condition: an absolute value Δθ (=|θ*−θa|) of a difference between the steering angle command value θ* and the actual steering angle θa is equal to or larger than a predetermined threshold Δθth.

Whether the first condition is satisfied or not can be determined based on the holding state information acquired from the steering wheel touch sensor 135. Whether the second condition is satisfied or not can be determined based on the information of the steering torque MT acquired from the steering torque sensor 132. Whether the third condition is satisfied or not can be determined based on the information of the actual steering angle θa acquired from the steering angle sensor 133.

It can be said that the control device 100 and the sensor group 130 constitute the "override detection device 40" shown in FIG. 2.

2-5. Steering Assist Control

At a time of manual driving by the driver, the control device 100 may execute steering assist control that assists the steering operation by the driver. More specifically, the control device 100 calculates an assist torque based on the steering torque MT and the vehicle speed V. Then, the control device 100 controls the operation of the EPS device 110 such that the assist torque is generated. As a result, a steering load of the driver is reduced.

3. Examples of Processing by Vehicle Control System 3-1. First Example

Figure 4:
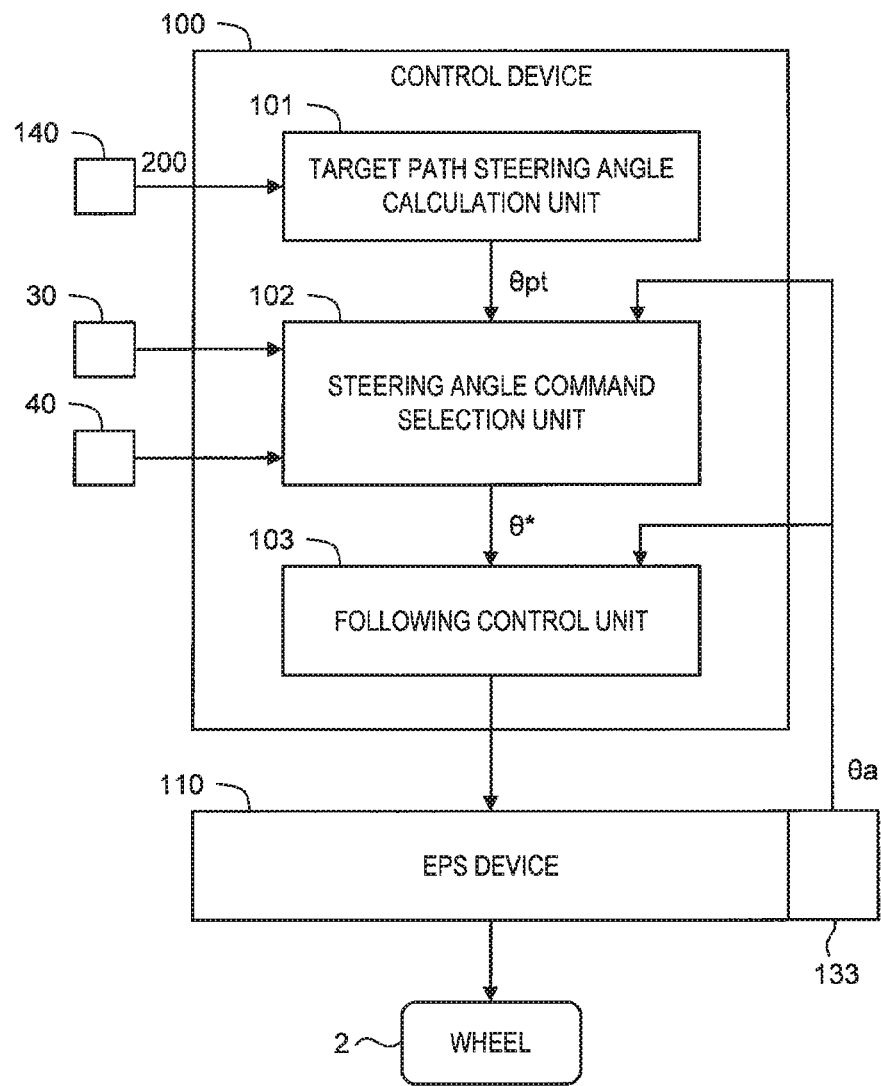
FIG. 4 is a block diagram for explaining a first example of processing by the vehicle control system according to the embodiment of the present disclosure.

FIG. 4 is a block diagram for explaining a first example of processing by the vehicle control system 10 according to the present embodiment. The control device 100 (the automatic steering control device 20) has a target path steering angle calculation unit 101, a steering angle command selection unit 102, and a following control unit 103 as functional blocks related to the automatic steering control. These functional blocks are achieved by the processor of the control device 100 executing a control program stored in the memory.

The target path steering angle calculation unit 101 calculates the target path steering angle θpt based on the driving environment information 200. The steering angle command selection unit 102 selects any one of the target path steering angle θpt and the actual steering angle θa as the steering angle command value θ*, and outputs the selected steering angle command value θ* to the following control unit 103. In other words, the steering angle command selection unit 102 switches the steering angle command value θ* between the target path steering angle θpt and the actual steering angle θa. The following control unit 103 controls the operation of the EPS device 110 such that the actual steering angle θa follows the steering angle command value θ*.

The selection (switching) of the steering angle command value θ* by the steering angle command selection unit 102 is as follows. The steering angle command selection unit 102 considers whether or not the stop state is detected by the stop state detection device 30 and whether or not the override operation is detected by the override detection device 40.

When the vehicle 1 is not in the stop state, that is, when the vehicle 1 is traveling, the steering angle command selection unit 102 selects the target path steering angle θpt as the steering angle command value θ* (θ*=θpt). As a result, the vehicle 1 travels so as to follow the target path PT. When the override operation is never performed after the vehicle 1 is stopped, the steering angle command selection unit 102 maintains the target path steering angle θpt as the steering angle command value θ* (θ*=θpt).

When the override operation is detected after the vehicle 1 is stopped, the steering angle command selection unit 102 selects the actual steering angle θa as the steering angle command value θ* (θ*=θa). In other words, the steering angle command selection unit 102 switches the steering angle command value θ* from the target path steering angle θpt to the actual steering angle θa. Accordingly, the following control unit 103 controls the operation of the EPS device 110 such that the actual steering angle θa follows the steering angle command value θ* (=the actual steering angle θa). This means that the actual steering angle θa does not change due to the automatic steering control.

Once the actual steering angle θa is selected as the steering angle command value θ*, the steering angle command selection unit 102 maintains that state until the vehicle 1 starts moving. In other words, during a period from when the override operation is detected in the stop state to when the vehicle 1 starts moving, the steering angle command selection unit 102 maintains the steering angle command value θ* at the actual steering angle θa (θ*=θa). Therefore, the actual steering angle θa does not change due to the automatic steering control and is maintained while reflecting the override operation by the driver. As a result, the driver's senses of strangeness and discomfort are suppressed.

When the start of the vehicle 1 is detected, that is, when the end of the stop state is detected, the steering angle command selection unit 102 selects the target path steering angle θpt as the steering angle command value θ* again (θ*=θpt). In other words, the steering angle command selection unit 102 switches the steering angle command value θ* from the actual steering angle θa to the target path steering angle θpt. As a result, the vehicle 1 travels so as to follow the target path PT.

Figure 5:
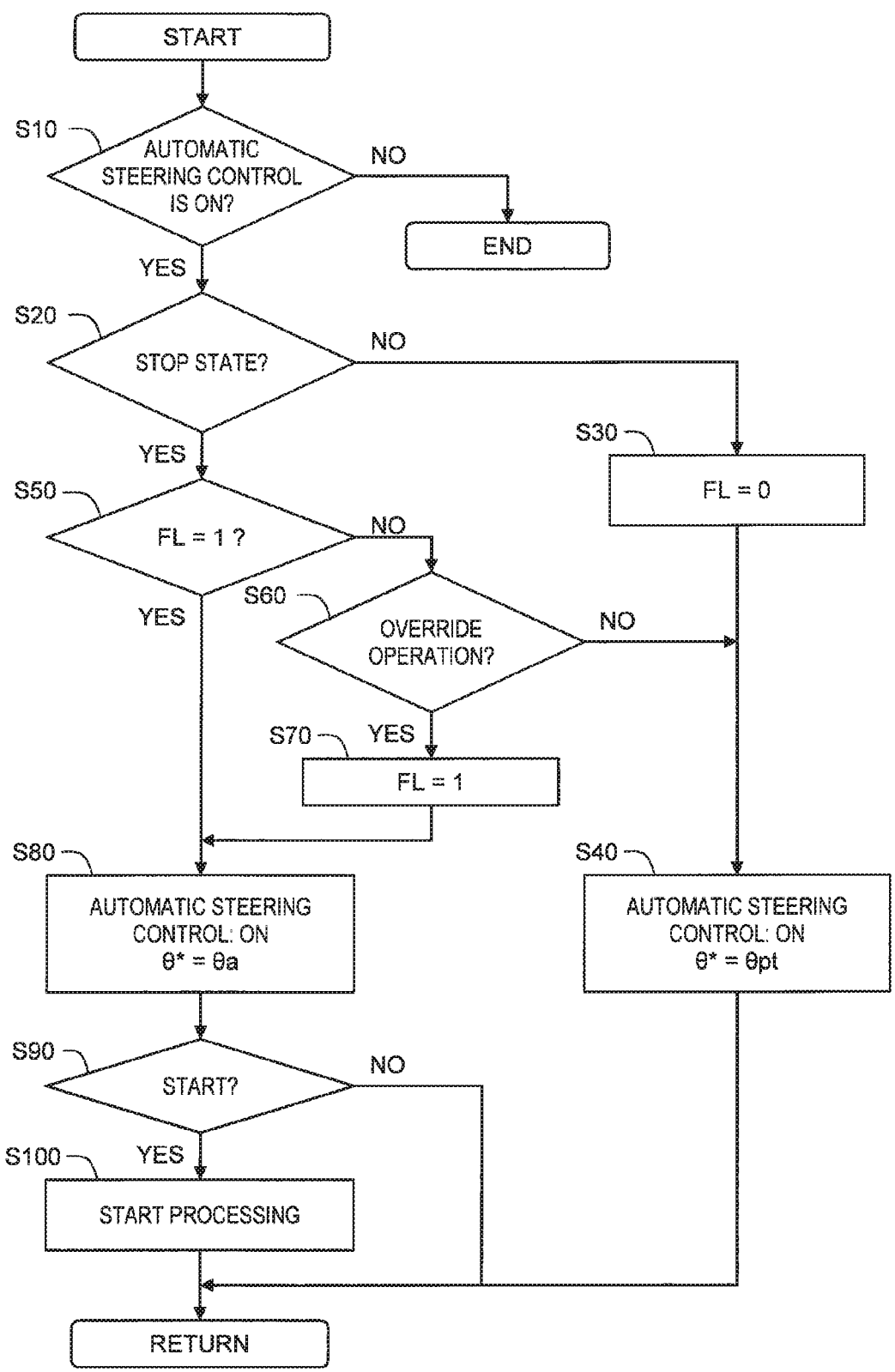
FIG. 5 is a flow chart showing the first example of processing by the vehicle control system according to the embodiment of the present disclosure.

FIG. 5 is a flow chart showing the first example. A process flow shown in FIG. 5 is repeatedly executed every certain cycle.

In Step S10, the control device 100 determines whether the function of the automatic steering control is ON (activated) or OFF (deactivated). For example, the driver can turn on/off the function of the automatic steering control by using a switch (not shown). When the function of the automatic steering control is OFF (Step S10; No), the processing ends. When the function of the automatic steering control is ON (Step S10; Yes), the processing proceeds to Step S20.

In Step S20, the automatic steering control device 20 determines whether or not the stop state is detected by the stop state detection device 30. When the stop state is not detected (Step S20; No), the processing proceeds to Step S30.

In Step S30, the automatic steering control device 20 resets an override flag FL to "0". The override flag FL is used in Steps described later. After that, the processing proceeds to Step S40.

In Step S40, the automatic steering control device 20 executes the automatic steering control. Here, the automatic steering control device 20 selects the target path steering angle θpt as the steering angle command value θ* (θ*=θpt). As a result, the vehicle 1 travels so as to follow the target path PT. Then, the processing returns back to Step S10.

On the other hand, when the stop state is detected by the stop state detection device 30 (Step S20; Yes), the processing proceeds to Step S50.

In Step S50, the automatic steering control device 20 determines whether the override flag FL is "1" or not. The override flag FL indicates presence or absence of a history of the override operation during the stop state. FL=0 means that there is no history of the override operation. On the other hand, FL=1 means that there is a history of the override operation. When the override flag FL is "1" (Step S50; Yes), the processing proceeds to Step S80. On the other hand, when the override flag FL is "0" (Step S50; No), the processing proceeds to Step S60.

In Step S60, the automatic steering control device 20 determines whether or not the override operation is detected by the override detection device 40. When the override operation is not detected (Step S60; No), the processing proceeds to Step S40 described above. On the other hand, when the override operation is detected (Step S60; Yes), the processing proceeds to Step S70.

In Step S70, the automatic steering control device 20 sets the override flag FL to "1". After that, the processing proceeds to Step S80.

In Step S80, the automatic steering control device 20 executes the automatic steering control. Here, the automatic steering control device 20 selects the actual steering angle θa as the steering angle command value θ* (θ*=θa). Therefore, the actual steering angle θa does not change due to the automatic steering control. After that, the processing proceeds to Step S90.

In Step S90, the automatic steering control device 20 determines whether or not the start of the vehicle 1 (i.e. the end of the stop state) is detected by the stop state detection device 30. The vehicle 1 may start manually by an acceleration operation by the driver or may start automatically by the automatic travel control device. When the start of the vehicle 1 is not detected (Step S90; No), the processing returns back to Step S10. On the other hand, when the start of the vehicle 1 is detected (Step S90; Yes), the processing proceeds to Step S100.

In Step S100, start processing is executed. An example of the start processing will be described later. After that, the processing returns back to Step S10.

It should be noted that, when switching the steering angle command value θ* from the target path steering angle θpt to the actual steering angle θa in the above-described Step S80, the automatic steering control device 20 may gradually change the steering angle command value θ*. Gradually changing the steering angle command value θ* can suppress a rapid behavior of the steering wheel 3.

Figure 6:
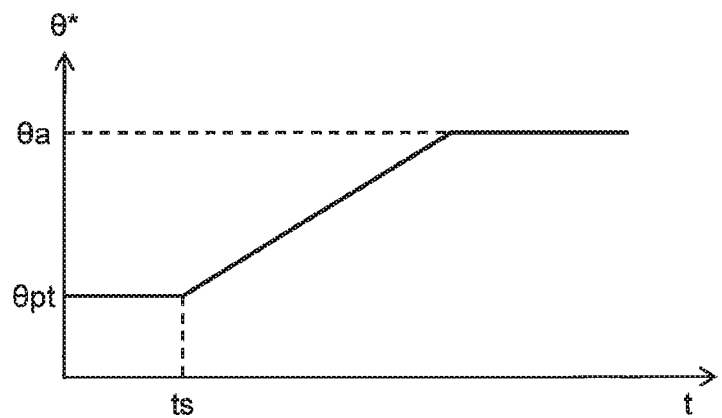
FIG. 6 is a timing chart showing an example of switching of a steering angle command value in Step S80 in FIG. 5.
Figure 7:
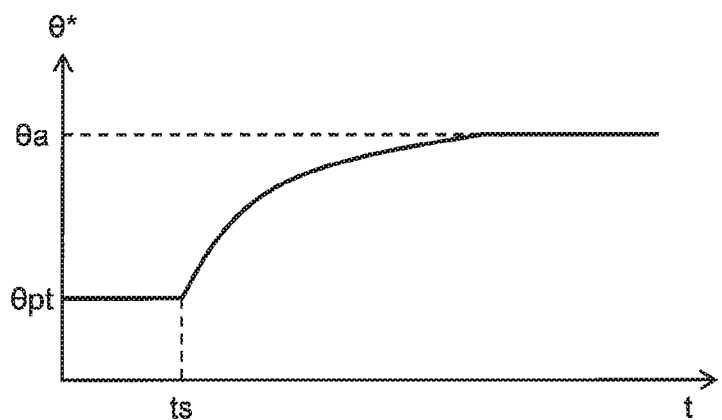
FIG. 7 is a timing chart showing another example of switching of the steering angle command value in Step S80 in FIG. 5.

FIGS. 6 and 7 are timing charts showing examples of the switching of the steering angle command value θ* in Step S80. A horizontal axis represents time, and a vertical axis represents the steering angle command value θ*. A timing is represents a timing when the override operation is detected in the stop state. For example, using a rate limiter can make the steering angle command value θ* change gradually as shown in FIG. 6. As another example, using a low pass filter can make the steering angle command value θ* change gradually as shown in FIG. 7.

Similarly, when switching the steering angle command value θ* from the actual steering angle θa to the target path steering angle θpt in the above-described Step S40, the automatic steering control device 20 may gradually change the steering angle command value θ*. Gradually changing the steering angle command value θ* can suppress a rapid behavior of the steering wheel 3.

Figure 8:
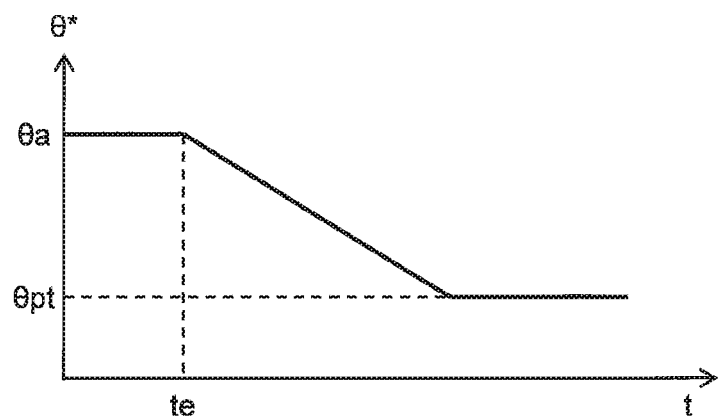
FIG. 8 is a timing chart showing an example of switching of the steering angle command value in Step S40 in FIG. 5.
Figure 9:
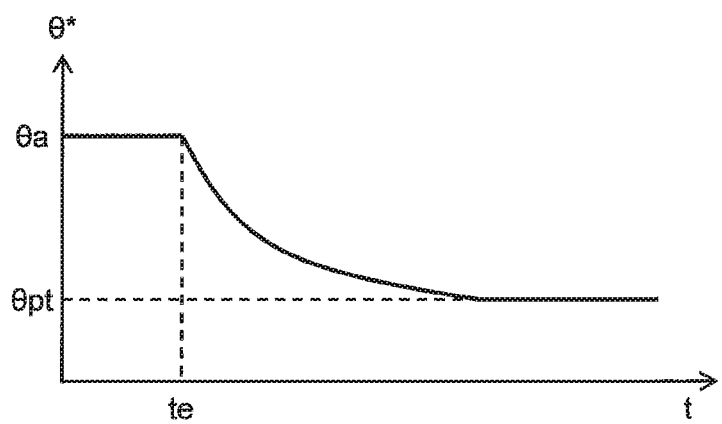
FIG. 9 is a timing chart showing another example of switching of the steering angle command value in Step S40 in FIG. 5.

FIGS. 8 and 9 are timing charts showing examples of the switching of the steering angle command value θ* in Step S40. A horizontal axis represents time, and a vertical axis represents the steering angle command value θ*. A timing t0 represents a timing when the end of the stop state is detected. For example, using a rate limiter can make the steering angle command value θ* change gradually as shown in FIG. 8. As another example, using a low pass filter can make the steering angle command value θ* change gradually as shown in FIG. 9.

According to the first example, as described above, the automatic steering control device 20 does not turn off the automatic steering control even when the override operation is detected in the stop state. Instead, during the period from when the override operation is detected to when the vehicle 1 starts moving, the automatic steering control device 20 sets the steering angle command value θ* to the actual steering angle θa (θ*=θa) with keeping the automatic steering control ON (activated).

As a result, during the period from when the override operation is detected to when the vehicle 1 starts moving, variation in the actual steering angle θa due to the automatic steering control is prohibited. Even when the override operation ends in the stop state, the variation in the actual steering angle θa due to the automatic steering control is prohibited until the vehicle 1 starts moving. In other words, during the period when the vehicle 1 is stopped, the actual steering angle θa is maintained while reflecting the override operation by the driver. As a result, the driver's senses of strangeness and discomfort are suppressed.

Moreover, according to the first example, even when the override operation is performed in the stop state, the automatic steering control is not turned off but continues. Therefore, an operation for resuming the automatic steering control is unnecessary.

Furthermore, according to the first example, the automatic steering control acts to maintain the actual steering angle θa even after the override operation ends in the stop state. Therefore, the steering wheel 3 is prevented from rotating automatically due to road surface gradient and the like when the override operation ends in the stop state.

3-2. Second Example

Figure 10:
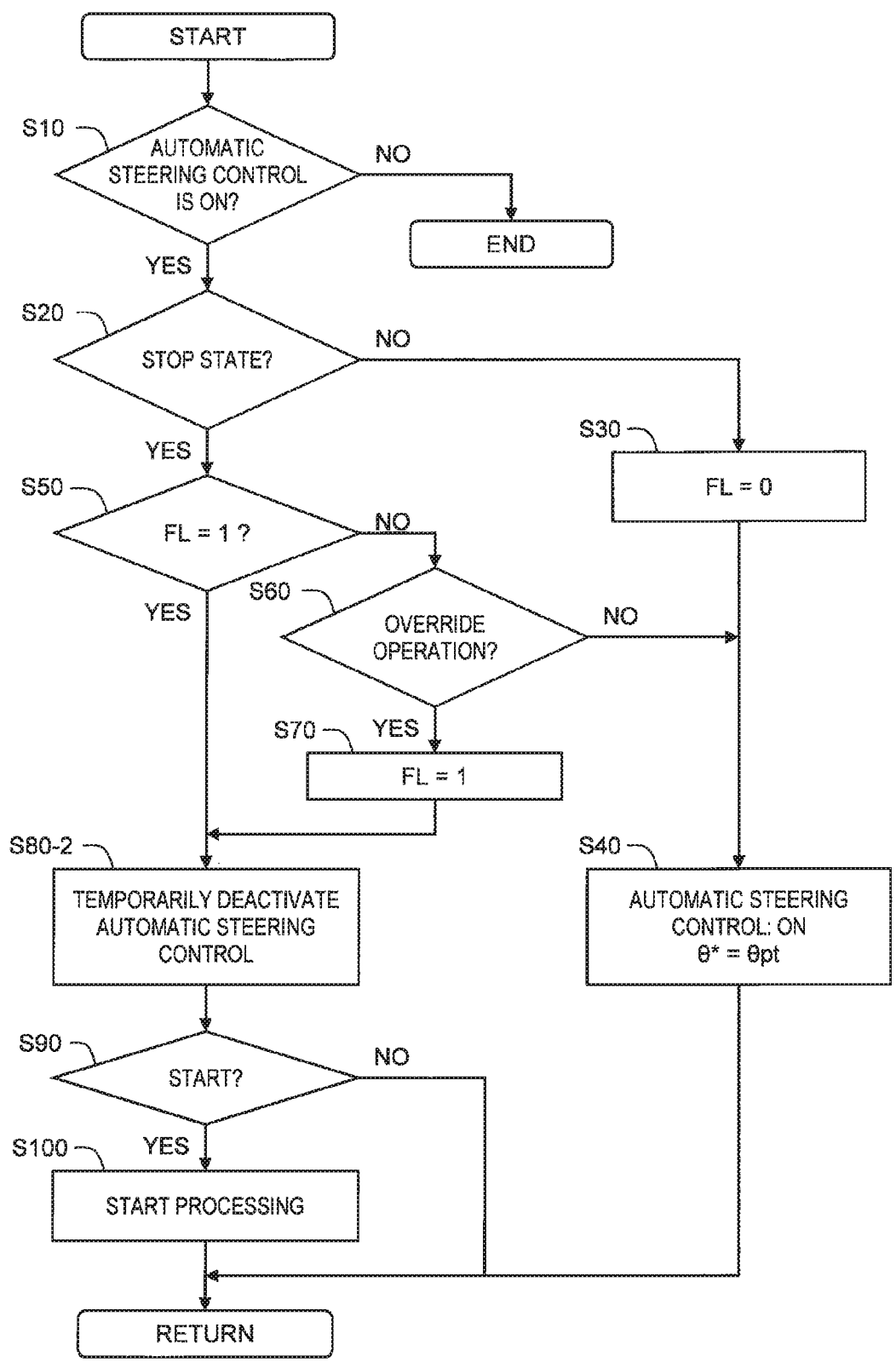
FIG. 10 is a flow chart showing a second example of processing by the vehicle control system according to the embodiment of the present disclosure.

FIG. 10 is a flow chart showing a second example of the processing by the vehicle control system 10 according to the present embodiment. An overlapping description with the above-described first example (see FIG. 5) will be omitted as appropriate. In the second example, the above-described Step S80 is replaced with Step S80-2. The others are the same as in the case of the first example.

In Step S80-2, the automatic steering control device 20 temporarily turns off (deactivates) the automatic steering control. After that, the processing proceeds to Step S90.

According to the second example, as described above, during the period from when the override operation is detected in the stop state to when the vehicle 1 starts moving, the automatic steering control device 20 temporarily turns off (deactivates) the automatic steering control. As a result, the variation in the actual steering angle θa due to the automatic steering control is prohibited during that period. Even when the override operation ends in the stop state, the automatic steering control is kept OFF until the vehicle 1 starts moving. In other words, during the period when the vehicle 1 is stopped, the actual steering angle θa is maintained while reflecting the override operation by the driver. As a result, the driver's senses of strangeness and discomfort are suppressed.

4. Example of Start Processing

Figure 11:
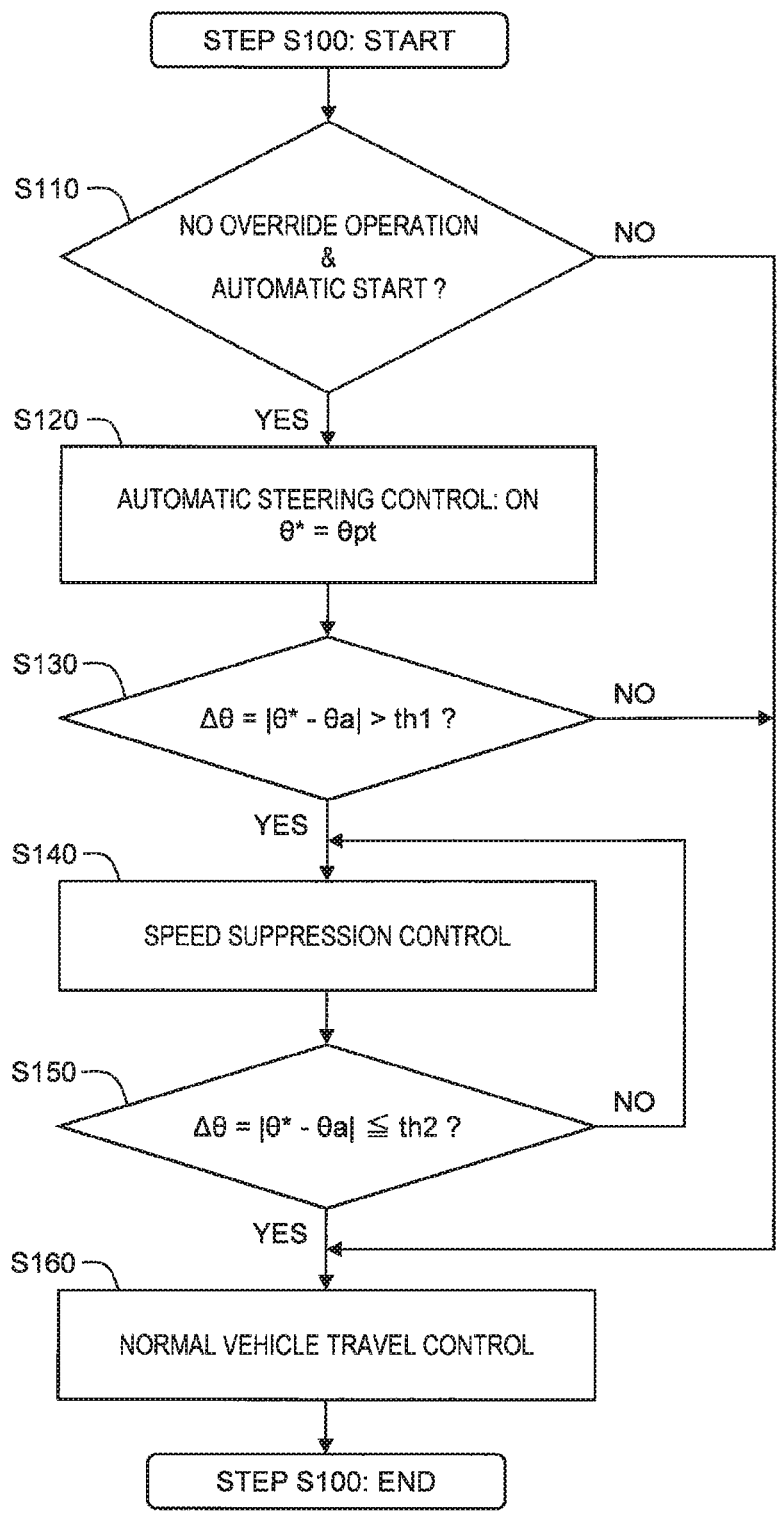
FIG. 11 is a flow chart showing an example of start processing (Step S100) in the embodiment of the present disclosure.

FIG. 11 is a flow chart showing an example of the start processing (Step S100) in the present embodiment.

In Step S110, the control device 100 determines whether or not the override operation is detected by the override detection device 40 and whether or not the start of the vehicle 1 is an automatic start by the automatic travel control device. In a case of the automatic start without the override operation (Step S110; Yes), the processing proceeds to Step S120. Otherwise (Step S110; No), the processing proceeds to Step S160.

In Step S120, the automatic steering control device 20 executes the automatic steering control. Here, the automatic steering control device 20 selects the target path steering angle θpt as the steering angle command value θ* (θ*=θpt).

It should be noted that, in the case of the first example described above, the automatic steering control device 20 switches the steering angle command value θ* from the actual steering angle θa to the target path steering angle θpt in Step S120. In this case, the automatic steering control device 20 may gradually change the steering angle command value θ* (see FIGS. 8 and 9). Gradually changing the steering angle command value θ* can suppress a rapid behavior of the steering wheel 3.

In subsequent Step S130, the automatic travel control device (the control device 10) determines whether or not an absolute value Δθ (=|θ*×θa|=|θpt×θa|) of a difference between the steering angle command value θ* and the actual steering angle θa is larger than a first threshold th1. When the absolute value Δθ is equal to or smaller than the first threshold th1 (Step S130; No), the processing proceeds to Step S160. On the other hand, when the absolute value Δθ is larger than the first threshold th1 (Step S130; Yes), the processing proceeds to Step S140.

In Step S140, the automatic travel control device executes "speed suppression control". In the speed suppression control, the automatic travel control device suppresses the vehicle speed V as compared with the case where the absolute value Δθ is equal to or smaller than the first threshold th1. For example, the automatic travel control device sets an upper limit of the vehicle speed V lower as compared with the case where the absolute value Δθ is equal to or smaller than the first threshold th1. As a result, it is possible to suppress a behavior or the vehicle 1.

In Step S150, the automatic travel control device determines whether or not the absolute value Δθ becomes equal to or smaller than a second threshold th2. The second threshold th2 is set to a value sufficiently smaller than the first threshold th1 described above. When the absolute value Δθ is larger than the second threshold th2 (Step S150; No), the processing returns back to Step S140. That is, the speed suppression control continues. On the other hand, when the absolute value Δθ becomes equal to or smaller than the second threshold th2 (Step S150; Yes), the processing proceeds to Step S160.

In Step S160, the automatic travel control device executes normal vehicle travel control.

As described above, when the difference between the steering angle command value θ* and the actual steering angle θa is large at the time of the automatic start, the automatic travel control device executes the speed suppression control. The speed suppression control can make it possible to suppress a behavior of the vehicle 1 at the time of the automatic start. For instance, it is possible to prevent the vehicle 1 from departing from a lane.

Moreover, the automatic travel control device continues the speed suppression control until the difference between the steering angle command value θ* and the actual steering angle θa becomes sufficiently small. As a result, it is possible to more surely suppress the behavior of the vehicle 1 after the automatic start.

What is claimed is:

1. A vehicle control system installed on a vehicle and comprising:
    an electronic control unit (ECU) including a processor programmed to:
        execute automatic steering control that determines a steering angle command value and controls steering of the vehicle such that an actual steering angle of at least one vehicle wheel follows the steering angle command value;
        detect a stop state where the vehicle is stopped; and
        detect an override operation by a driver of the vehicle, wherein
        the override operation is a steering wheel operation performed by the driver which changes the actual steering angle to a value different from a target path steering angle determined during execution of the automatic steering control,
    the ECU is further programmed to:
        when the override operation is detected in the stop state, prohibit variation, by the automatic steering control, in the actual steering angle changed by the override operation, until the vehicle starts moving;
        during a period from when the override operation is detected in the stop state to when the vehicle starts moving, set the steering angle command value to the actual steering angle changed by the override operation while keeping the automatic steering control activated; and
        when the vehicle starts moving, set the steering angle command value to the target path steering angle.

2. The vehicle control system according to claim 1, wherein the ECU is further programmed to control travel of the vehicle, wherein
    when making the vehicle start automatically, the processor is further programmed to determine whether or not an absolute value of a difference between the steering angle command value and the actual steering angle is larger than a first threshold, and
    when the absolute value is larger than the first threshold, the processor is further programmed to execute speed suppression control that suppresses a speed of the vehicle as compared with a case where the absolute value is equal to or smaller than the first threshold.

3. The vehicle control system according to claim 2, wherein
    the ECU is further programmed to continue the speed suppression control until the absolute value becomes equal to or smaller than a second threshold being smaller than the first threshold.

4. The vehicle control system according to claim 1, wherein the ECU is further programmed to, when the override operation ends while the vehicle is in the stop state, prohibit variation, by the automatic steering control, in the actual steering angle changed by the override operation, until the vehicle starts moving.

5. A vehicle control method for controlling a vehicle using an electronic control unit, comprising:
    executing automatic steering control that determines a steering angle command value and controls steering of the vehicle such that an actual steering angle of at least one vehicle wheel follows the steering angle command value;
    detecting a stop state where the vehicle is stopped; and
    detecting an override operation by a driver of the vehicle, wherein
    the override operation is a steering wheel operation performed by the driver which changes the actual steering angle to a value different from a target path steering angle determined during execution of the automatic steering control,
    when the override operation is detected in the stop state, prohibiting variation, by the automatic steering control, in the actual steering angle changed by the override operation, until the vehicle starts moving;
    during a period from when the override operation is detected in the stop state to when the vehicle starts moving, setting the steering angle command value to the actual steering angle changed by the override operation while keeping the automatic steering control activated; and
    when the vehicle starts moving, setting the steering angle command value to the target path steering angle.

* * * * *